A. STRIDELL, O. R. HALBOM & R. M. McNEIL.
LOCK HOOK.
APPLICATION FILED MAY 20, 1908.
964,068.  Patented July 12, 1910.
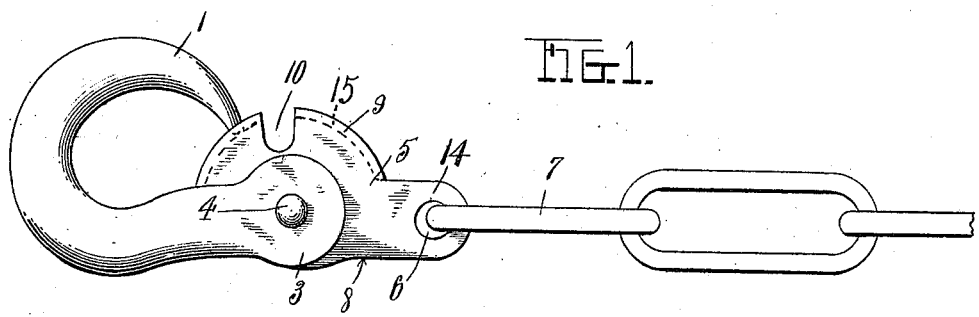
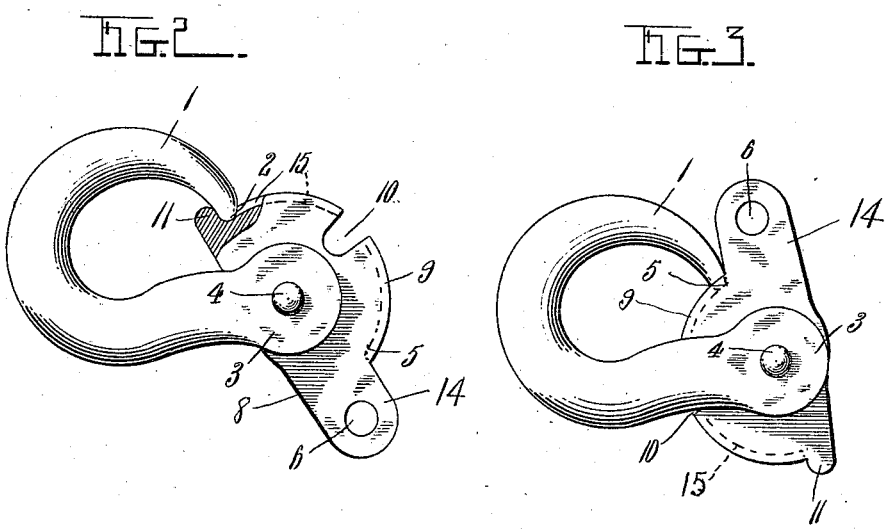
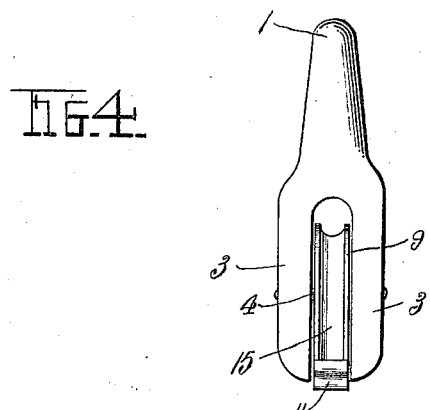
Witnesses
J. H. Crawford
M. T. Miller
Inventors
Axel Stridell,
Oley R. Halbom &
R. M. McNeil
By Chandler & Chandler
Attorney
THE NORRIS PETERS CO., WASHINGTON, D. C.

UNITED STATES PATENT OFFICE.

AXEL STRIDELL, OLEY R. HALBOM, AND ROSE M. McNEIL, OF CARROLLTON, WASHINGTON.

LOCK-HOOK.

964,068.

Specification of Letters Patent. Patented July 12, 1910.

Application filed May 20, 1908. Serial No. 433,984.

*To all whom it may concern:*

Be it known that we, AXEL STRIDELL, OLEY R. HALBOM, and ROSE M. McNEIL, citizens of the United States, residing at Carrollton, in the county of Cowlitz, State of Washington, have invented certain new and useful Improvements in Lock-Hooks; and we do hereby declare the following to be a full, clear, and exact description of the invention, such as will enable others skilled in the art to which it appertains to make and use the same.

This invention relates to an improvement in hooks.

The object of our invention is to provide a hook especially adapted to be used in connection with logging chains and constructed so that the hook may be detachably secured to the chain by means of a readily operated detent as will be described more fully hereinafter.

In the accompanying drawing we have shown in Figure 1 an elevation of a lock hook embodying our invention. Fig. 2 shows the tumbler link tilted into one of its extreme positions. Fig. 3 discloses the tumbler link tilted in its remaining extreme position, and Fig. 4 shows an end view of the hook.

In hauling logs drag chains are employed which are hooked about the logs, to provide a securing means whereby the log may be handled. It frequently happens that the bill of the hook becomes disengaged with the chain when the latter is slackened, and extreme difficulty is frequently experienced in rearranging the chain about the log.

To provide a hook that can be locked to the chain to prevent any accidental displacement is the aim of our invention.

Referring by number to the accompanying drawings, 1 represents the recurved end of a hook which has its termination rounded as shown at 2 in Fig. 2. The securing end 3 is bifurcated as shown in Fig. 4 to provide two securing ears which are perforated to receive the pin 4. In connection with this hook we use a tumbler link 5 having a suitable opening 6 adapted to receive a chain link 7 as disclosed in Fig. 1. Adjacent its center this tumbler link is perforated so that the same may be pivotally mounted upon the pin 4 as shown in Fig. 2. This link has a flat edge 8 from which extends the semi-circular guard forming portion 9 having a suitable link seating 10 and ending in the stop lip 11 adapted to be brought into engagement with the end of the hook as shown in Fig. 2. The edge of the extending semi-circular guard plate 9 is grooved as shown at 15 so that the end 2 of the hook is normally held within this groove as disclosed in the drawings.

In Fig. 1 the hook is shown with the tumbler link in its intermediate position. To introduce a link the same is placed within the seating 10 when the tumbler link is tilted backward permitting the link to escape into the bight of the hook. When the chain is drawn out, the tumbler link is again carried into its normal position as shown in Fig. 1 so that the link will remain locked within the hook. When the tumbler link is tilted into one of its extreme positions the lip 11 checks its movement and prevents the accidental detachment of the hook as shown for instance in Fig. 2. In its remaining extreme position the extending portion 14 of the tumbler 5 comes into engagement with the hook end as disclosed in Fig. 3.

It is of course understood that these hooks may be made of different sizes.

From the foregoing description it will be seen that we provide a hook embodying a bifurcated perforated securing end and that the hook portion is recurved and ends proximal to said securing end, and that the tumbler link is pivotally secured adjacent its center.

And having thus described our said invention, what we claim is—

In a combination with a hook having a bifurcated shank and a recurved bill overhanging said shank, of a tumbler having an arcuate side portion and a stop at each end pivoted to the bifurcated shank portion and provided with a transverse link receiving recess and a peripheral groove extending from either side of said recess and terminating in said stops one of said stops being elongated and provided with an eye to receive the free end of a line.

In testimony whereof, we affix our signatures in presence of two witnesses.

AXEL STRIDELL.
OLEY R. HALBOM.
R. M. McNEIL.

Witnesses:
J. E. STONE,
A. L. LONG.